Patented June 21, 1949

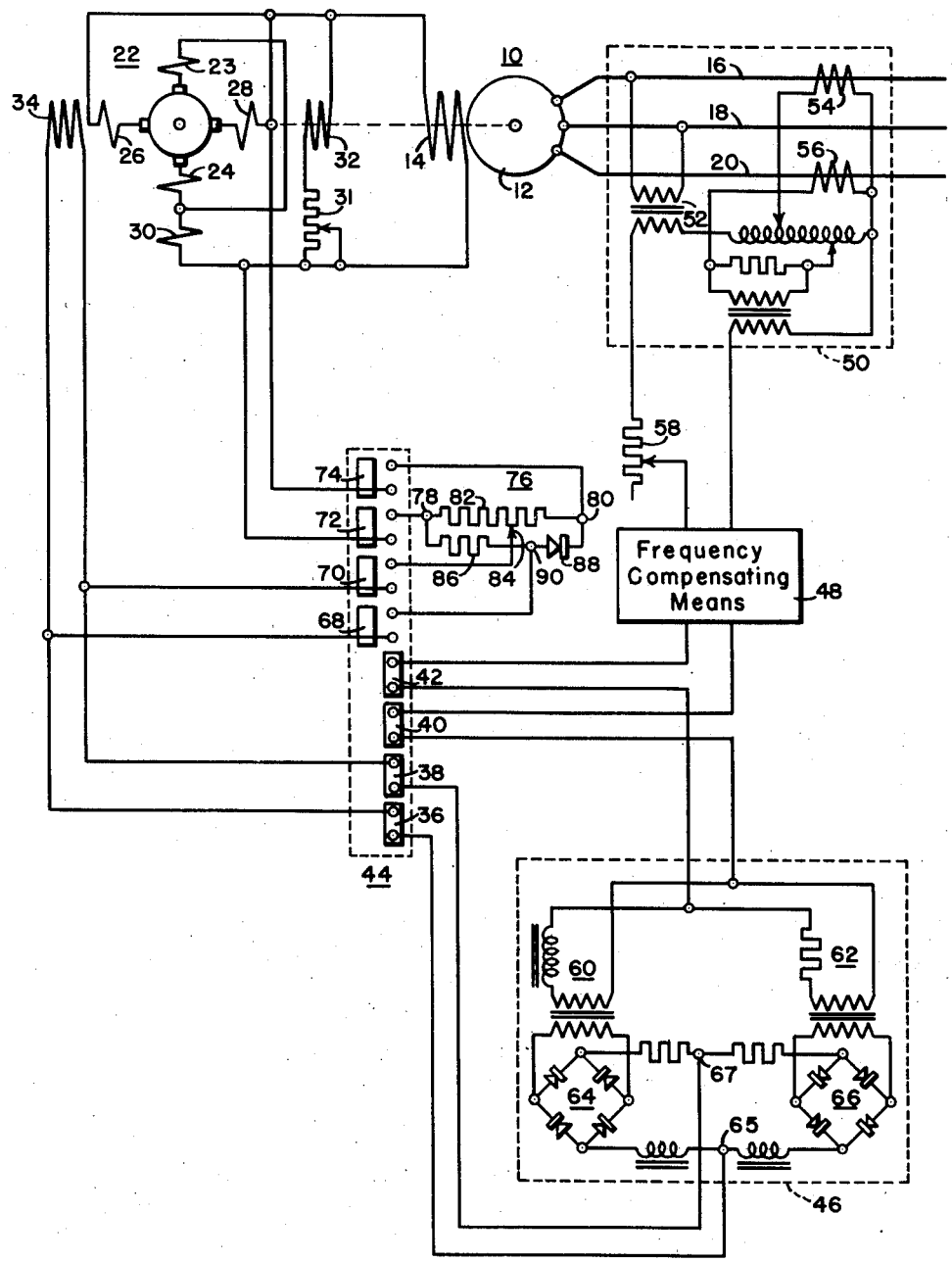

2,473,882

UNITED STATES PATENT OFFICE 2,473,882

REGULATING SYSTEM

Edwin L. Harder and Carroll E. Valentine, Pittsburgh, Pa., assignors to Westinghouse Electric Corporation, East Pittsburgh, Pa., a corporation of Pennsylvania Application November 29, 1945, Serial No. 631,726

7 Claims. (Cl. 322—77)

This invention relates to regulating systems.

Regulating systems which utilize conventional exciters for controlling the excitation of generators have been known for many years. The conventional exciters are designed to have a saturation curve such that saturation starts at a point below the lowest normal operating point on the curve in order to permit a stable manual control of the exciter. This is readily accomplished, for with a hand controlled rheostat adjusted in a predetermined manner and connected in the field circuit of the exciter, it is found that the resultant field circuit resistance line provides a definite intersection at a point along the exciter saturation curve and that the exciter voltage is at a value corresponding to the point of intersection. Such manual control is stable in that if the voltage of the exciter tends to rise, the increase is insufficient to produce enough field current to sustain the higher value, whereas if the voltage tends to decrease, the field current of the exciter is excessive and functions to restore the voltage to a value corresponding to the point of intersection referred to hereinbefore.

Recently there has been developed a self-excited or "series tuned" exciter which normally operates along the linear part of its saturation curve. Such exciters have a series field winding for normally supplying the majority of the excitation requirements with a shunt field for supplying the remainder of the excitation of the machine and at least one control field winding disposed to be directionally energized in response to the operation of a generator, the excitation of which is controlled by the exciter. As the self-excited exciter operates on the linear part of its saturation curve, it cannot be successfully manually controlled by a rheostat in series with a shunt field but instead, if such a manual control is utilized, it is found to be extremely unstable. This becomes evident when it is considered that the field circuit resistance line for the self-excited exciter coincides with the air gap line of the exciter throughout the linear part of the saturation curve, and that the same rheostat setting is required for all voltages from zero up to the saturation point. Thus, as the voltage of the exciter tends to change, the field current changes just the right amount to support the changed voltage and there is no tendency to apply a restoring force to correct the change in voltage.

An object of this invention is to provide in a regulating system which utilizes a self-excited exciter for controlling the excitation of a generator, for a manual control of the system while retaining the operating characteristics of the exciter.

Other objects of this invention will become apparent from the following description when taken in conjunction with the accompanying drawing in which the single figure is a diagrammatic representation of a regulating system embodying the teachings of this invention.

Referring to the drawing, there is illustrated a generator 10, the voltage of which is to be regulated. The generator 10 comprises the armature windings 12 and the field windings 14, the armature windings 12 being connected for supplying a three-phase load circuit represented by conductors 16, 18 and 20. The field windings 14 are connected to be supplied from a rotary direct-current generator or self-excited exciter 22.

The self-excited exciter 22 schematically represented is of four-pole constructiton having a plurality of field windings and is of the general construction and type disclosed and claimed in the copending application, Serial No. 607,440, filed July 27, 1945, in the names of W. R. Harding and A. W. Kimball, and assigned to the assignee of this invention. As disclosed therein, the exciter or rotary direct-current generator 22 has a number of pole pieces and an equal number of commutator brushes arranged to assume sequentially positive and negative electrical potentials. In the embodiment schematically shown in the drawing, the positive brushes of the four-pole machine are interconnected by an equalizing connection as are also the negative brushes of the machine.

The exciter generator 22 is provided with forcing fields 23 and 24 connected in series circuit relation in one of the equalizing connections, the fields 23 and 24 being so divided as to constitute two groups of four windings each, a corresponding winding from each group being arranged on each of the four poles to be equally and sequentially excited by current flowing between the brushes. In addition to the forcing fields 23 and 24, the exciter generator 22 is also provided with compensating windings 26 and 28 disposed on two of the poles and self-sustaining or exciting field windings 30 and 32 which are so divided and positioned on all of the poles that the flux distribution of the self-excitation is symmetrical.

The field windings 30 are connected in series in the load circuit, whereas the field windings 32 are connected in shunt across the load circuit for the exciter generator 22, a calibrating resistance 31 being connected in series with the shunt fields.

The series and shunt field windings of the exciter generator 22 may be cumulative with the series field windings 30 providing slightly less than required sustaining field strength and the shunt field 32 being only strong enough for adjusting to full self-excitation field strength to compensate for manufacturing differences and installation adjustment or the like. On the other hand, the shunt field windings 32 may be wound to oppose the series field windings 30 where the windings 30 supply slightly more than required sustaining field strength.

The series tuned exciter generator 22 is also provided with a control field winding 34 so wound as to provide equal windings on two of the poles to increase the strength of one while decreasing the strength of the other when energized to distort the flux distribution in the field structure in a degree depending upon the energization of the control field winding. By utilizing the control field winding 34 in the exciter generator 22, the plurality of field windings cooperate in the single machine as disclosed in the Harding et al. application Serial No. 607,440, identified hereinbefore, to give an extremely sensitive and quick response of generated voltage to changes of a comparatively weak input voltage while at the same time giving a high amplification ratio.

The control field winding 34 which is disposed to be normally deenergized when the generator 10 is operating to maintain a predetermined line voltage and to be directionally energized as the line voltage increases or decreases from the predetermined value under automatic regulation as described hereinafter to so control the exciter generator 22 as to correct the excitation of the generator 10 to correct for such departure and maintain the line voltage substantially at the predetermined value.

As illustrated, the control field winding 34 is disposed to be connected through segments 36, 38, 40 and 42 of a controller 44, a voltage reference network 46 and a frequency compensating means 48 to be supplied by the line voltage, a network 50 being utilized to derive a positive sequence component of the line voltage for supplying a measure of the line voltage.

The network 50 for deriving the positive sequence component of the line voltage is disclosed and claimed in the copending application of E. L. Harder, Serial No. 560,299, filed October 25, 1944, Now Patent No. 2,426,018, issued August 19, 1947. Briefly, the network comprises the potential transformer 52 for deriving a single phase of the three-phase line voltage having no zero-sequence voltage-component and current transformers 54 and 56 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component of the line voltage. Other embodiments of the positive-sequence component network 50 are disclosed and claimed in the aforementioned application Serial No. 560,299, and may be employed instead of the specific network 50 illustrated in the drawing.

An adjustable resistor 58 is connected in the output circuit from the network 50 for providing a voltage adjusting means. The frequency compensating means 48 may be any suitable arrangement of capacitors and inductance apparatus for accomplishing the purpose of compensating for frequency. As will be appreciated, in many cases the frequency of the line voltage will not fluctuate greatly, and it may not be necessary to utilize the compensating means 48, but instead the positive-sequence component of the line voltage from the network 50 will be supplied directly to the voltage reference network 46.

Th voltage reference network 46 is disclosed in detail in the copending application Serial No. 567,256, filed December 8, 1944, of E. L. Harder et al., now Patent 2,428,566, issued October 7, 1947, and briefly comprises a non-linear impedance circuit 60 and a linear impedance circuit 62 connected to be simultaneously energized in accordance with the line voltage and, in particular, by the positive-sequence component of the line voltage. The non-linear impedance circuit 60 and the linear impedance circuit 62 are connected through insulating transformers across dry-type rectifying units 64 and 66, respectively, the output terminals of the rectifying units being connected in series circuit relation with each other through suitable series-connected resistors and series-connected smoothing reactors. The control field winding 34 of the exciter generator 22 is disposed to be connected through segments 36 and 38 across the direct-current series circuit connecting the rectifying units at points 65 and 67, respectively, which for the predetermined line voltage are at zero potential. The elements of the non-linear impedance circuit 60 and of the linear impedance circuit 62 have intersecting impedance characteristics and, as the line voltage fluctuates from the predetermined value, the current drawn by the circuits varies with the result that an unbalanced condition between the output of the rectifying units occurs and the control field winding 34 is energized in one or the other directions.

The controller 44 is also provided with segments 68, 70, 72 and 74 disposed to be actuated to a circuit closing position when segments 36, 38, 40 and 42 are actuated to a circuit opening position, to connect the control field winding 34 to a manual control circuit 76 for directionally controlling the energization of the control field winding 34. In this instance, the control circuit 76 comprises two parallel circuits connected between common terminals 78 and 80, one of the parallel circuits consisting of a resistor 82 having an intermediate adjustable tap 84 and the other of the parallel circuits consisting of a resistor 86 and a dry type rectifier, for example, a copper-oxide rectifier 88 connected in series circuit relation through an intermediate fixed tap 90. The common terminals or taps 78 and 80 are disposed to be connected by segments 72 and 74, respectively, across the output of the exciter generator 22 when the control field winding 34 is connected through segments 68 and 70 to the fixed tap 90 and the adjustable tap 84, respectively.

For the purpose of better understanding the operation of the manual control as will be described hereinafter, the dry type rectifier unit 88 may be considered as a battery in that the forward potential drop across the unit is substantially constant as the current through the rectifier changes and the rectifier 88 may, therefore, be considered as a substantially constant potential device. The constant potential characteristic of the rectifier is the characteristic primarily employed in the manual control circuit instead of the rectifying characteristic.

Instead of the rectifier 88, any non-linear impedance in which the voltage drop is not proportional to the current may be utilized. For example, non-linear resistance elements such as those formed from thyrite or hot wire materials may be utilized in place of the constant potential device illustrated. In such case the resistance between taps 84 and 80 may be considered as being substantially constant relative to the non-linear resistance element.

In operation, with the controller 44 in the position illustrated and assuming that the generator 10 and series tuned exciter generator 22 are being driven by some suitable means (not shown) for supplying power at a constant voltage to a load (not shown), the windings 30 and 32 of the exciter generator 22 are sufficient for normally maintaining the excitation of the generator 10 to maintain substantially constant voltage across the line conductors 16, 18 and 20. Under the constant voltage conditions of the line, the positive-sequence network 50 functions to deliver a positive-sequence component of the generator voltage to the frequency compensating means 48 and from thence to the network 46.

The non-linear impedance circuit 60 and the linear impedance circuit 62 are so selected that when the positive-sequence component of the predetermined line voltage is impressed upon the network 46, the circuits 60 and 62 have intersecting impedance characteristics and the voltages across rectifying units 64 and 66 and at the points 65 and 67 are equal and so balanced that a voltage drop does not appear across the control field winding 34.

If the line voltage should increase from the predetermined value, then the positive-sequence component delivered to the network 46 is increased, with the result that the non-linear impedance circuit 60 draws more current than the linear impedance circuit 62 and the output voltages across the rectifying units 64 and 66 are unbalanced. With such an unbalanced condition, the larger potential across the rectifying unit 64 effects a voltage drop across the control field winding 34 in a direction to produce an action to oppose the excitation of the field windings 30 and 32 to decrease the output of the exciter generator 22 to decrease the excitation of the generator 10 to return the line voltage to the predetermined value.

If the change in the line voltage is a decrease, then the linear impedance circuit 62 draws more current than the non-linear impedance circuit 60 and the network is unbalanced to effect a voltage drop across the control field winding 34 in a direction to produce an action to aid the field windings 30 and 32 to increase the excitation of the exciter generator 22 and thereby effect an increase in the excitation of the generator 10 to maintain the line voltage at its predetermined value.

In many industrial and commercial applications, it is required that a manual control be utilized for a part of the regulating action instead of the automatic regulating operation just described. In such case, the controller 44 is actuated to move segments 36, 38, 40 and 42 to an open circuit position to disconnect the control field winding 34 from the network 46 and to actuate segments 68, 70, 72 and 74 to circuit closing position to connect the control field winding 34 to taps 84 and 90 and the manual control circuit 76 across the exciter generator 22. The adjustable tap 84 is positioned in a predetermined position whereby the voltage drop across the section of resistor 82 connected between taps 84 and 80 equals the voltage drop across the constant potential device 88 between taps 90 and 80 when the generator 10 is operated to maintain the predetermined line voltage and consequently, with the field windings 30 and 32 supplying sufficient excitation for the exciter generator 22 to maintain line voltage, the field current in control field winding 34 is zero.

In operation, if the voltage of exciter generator 22 tends to rise for any reason, the voltage across the section of resistor 82 connected between taps 84 and 80 also rises whereas the voltage across the rectifier 88 connected between taps 90 and 80 remains substantially constant. Under such conditions, the potential at tap 84 rises with respect to the potential at tap 90 and current flows from the tap 84 through segment 70, control field winding 34 and segment 68 to tap 90 whereby the excitation effect of winding 34 produces an action to oppose the excitation effect of windings 30 and 32 to reduce the voltage of the exciter generator 22 to its original value at which value, balance in the manual control circuit 76 is again restored and the current flow through the control field winding 34 is reduced to zero.

If the voltage of exciter generator 22 tends to decrease, then the potential at tap 90 is large with respect to the potential at adjustable tap 84 and the flow of current in the control field winding 34 is reversed whereby the directional effect of the energization of winding 34 produces an action to aid the excitation of the exciter generator 22 by reason of windings 30 and 32 to increase the excitation of exciter generator 22 to its original value to restore the balance of the control circuit 76 and thereby effect the deenergization of control field winding 34.

A desirable function of the manual control circuit 76 will be appreciated when the operation of the exciter generator 22 is considered without the control circuit 76 being connected to respond to the voltage of the exciter 22. For example, with the manual control circuit 76 disconnected from the exciter generator 22, if a reactive load or a short circuit is suddenly applied to the generator 10, such loads are accompanied by a transient increase in current flowing in the field winding 14 which, in turn, causes a transient increase in the current flowing in the series field winding 30 of exciter 22. If the transient field current in field windings 30 and 14 could be maintained at their initial values, steady operation of the generator 10 under the load would be obtained and the short circuit current would be maintained at the transient value instead of reducing to its lower synchronous value.

The exciter generator 22 in effect, tends to sustain the high transient value of field current for the reason that the transient current in field winding 30 tends to effect an increase in the voltage output of exciter 22 to increase the excitation of generator 10 and thereby tend to maintain the field current of the generator 10 at its transient value. However, with the manual control circuit 76 connected across the exciter generator 22 as described, the increase thus resulting in the excitation of exciter 22 by reason of the transient current, effects a change in the potential drop across the section of resistor 82 between taps 84 and 80 whereby current flows in the control field winding 34 to produce an action in opposition to the excitation effect of windings 30 and 32 to cause a slow drift of the voltage of exciter generator 22 to its original predetermined value to effect a reduction in the voltage of generator 10. This action is of sufficient duration to permit short circuits on the line conductors 16, 18 and 20 for a sufficiently sustained period that circuit breaker (not shown) coordination can be obtained. At the same time that the action of the transient current is taking place, there is also a change in the voltage across the generator 10 and as will be apparent, the normal automatic regulating action of the manual control circuit 76 is also of such duration that a manual adjustment of the circuit 76 can be had to correct the voltage before the change from transient to synchronous voltage can be corrected automatically.

In forcing the correction by adjusting the circuit 76, if it is desired to raise the voltage of the exciter generator 22 and consequently raise the voltage of generator 10, the adjustable tap 84 is moved along resistor 82 towards the common tap 80 whereby the voltage drop across the section of resistor 82 connected between taps 84 and 80 is less than the voltage drop across the constant potential device 88 between taps 90 and 80 with the result that current flows from the tap 90 through segment 68, control field winding 34 and segment 70 to the tap 84 whereby the excitation of control field winding 34 produces an action to aid the excitation of self-energizing field windings 30 and 32 to increase the voltage across the exciter 28.

Conversely, if it is desired to force the voltage of exciter generator 22 to a lower value, the adjustable tap 84 is moved along resistor 82 towards the common tap 78 whereby the voltage drop across the section of resistor 82 between taps 84 and 80 is larger than the voltage drop across the rectifier 88 and current flows in the opposite direction in control field winding 34 to produce an action to oppose the excitation effect of self-energizing windings 30 and 32 to decrease the voltage across the exciter 22. The increase or decrease in the voltage across the exciter generator 22 will be determined by the setting of the adjustable tap 84 as the control field winding 34 will be energized in the one or other directions until the voltage drop from tap 84 to tap 80 equals the voltage drop from tap 90 to tap 80.

The manual control circuit 76 utilized in this invention has an excellent settling ability for good stability as evidenced by the fact that when a heavy load is applied to the line conductors and then later removed while the manual control circuit is connected to control the energization of the control field winding 34, the voltage of the generator 10 is returned to its original value within a small fraction of one percent. Further, as the manual control circuit 76 automatically provides a relatively small energization for the control field winding 34 for changes in the exciter voltage but a large forcing action when the adjustable tap 84 is moved beyond the usual setting range, it is found that a very fast restoration of voltage can be obtained with the manual control.

We claim as our invention:

1. In a regulating system for a dynamo-electric machine, in combination, an exciter for supplying the field excitation of the dynamo-electric machine, a pair of circuits disposed to be connected in parallel circuit relation across the exciter, one of the parallel circuits consisting of a resistor having an adjustable tap, the other of the parallel circuits consisting of a resistor and a non-linear impedance connected in series circuit relation through a fixed tap therebetween, and a control field winding for the exciter disposed to be connected to the adjustable tap and the fixed tap to be directionally energized in accordance with the potential at the adjustable and fixed taps.

2. In a regulating system for a dynamo-electric machine, in combination, an exciter for supplying the field excitation of the dynamo-electric machine, the exciter having a self-energizing field winding for normally supplying the field excitation thereof, a pair of circuits disposed to be connected in parallel circuit relation across the exciter, one of the parallel circuits consisting of a resistor having an adjustable tap, the other of the parallel circuits consisting of a resistor and a non-linear impedance connected in series circuit relation through a fixed tap therebetween, and a control field winding for the exciter disposed to be connected to the adjustable tap and the fixed tap to be directionally energized in accordance with the potential at the adjustable and fixed taps.

3. In a regulating system for a dynamo-electric machine, in combination, an exciter for supplying the field excitation of the dynamo-electric machine, a pair of circuits disposed to be connected in parallel circuit relation across the exciter, one of the parallel circuits consisting of a resistor having an adjustable tap, the other of the parallel circuits consisting of a resistor and a constant potential device connected in series circuit relation through a fixed tap therebetween, and a control field winding for the exciter disposed to be connected to the adjustable tap and the fixed tap to be directionally energized in accordance with the potential at the adjustable and fixed taps.

4. In a regulating system for a dynamo-electric machine, in combination, an exciter for supplying the field excitation of the dynamo-electric machine, the exciter having a self-energizing field winding for normally supplying the field excitation thereof, a pair of circuits connected in parallel circuit relation across the exciter, one of the parallel circuits consisting of a resistor having an adjustable tap, the other of the parallel circuits consisting of a resistor and a constant potential device connected in series circuit relation through a fixed tap therebetween, and a control field winding for the exciter connected to the adjustable tap and the fixed tap to be directionally energized in accordance with the potential at the adjustable and fixed taps.

5. In a regulating system for a dynamo-electric machine, in combination, an exciter for supplying the field excitation of the dynamo-electric machine, the exciter having a self-energizing field winding for normally supplying the field excitation thereof, a pair of circuits connected in parallel circuit relation across the exciter, one of the parallel circuits consisting of a fixed resistor having an intermediate adjustable tap, the other of the parallel circuits consisting of a fixed resistor and a copper-oxide rectifier unit connected in series circuit relation through a fixed tap therebetween, and a control field winding for the exciter connected to the adjustable tap and the fixed tap to be directionally energized in accordance with the potential at said taps.

6. In a regulating system for a dynamo-electric machine, in combination, an exciter for supplying the field excitation of the dynamo-electric machine, the exciter having a self-energizing field winding for normally supplying the field excitation thereof and a control field winding disposed to be directionally energized under predetermined conditions, a pair of circuits connected in parallel circuit relation between common taps disposed to be connected across the exciter, one of the parallel circuits consisting of a resistor having an adjustable tap disposed between the common taps, the other of the parallel circuits consisting of a resistor and a constant potential device connected in series circuit relation through a fixed tap, and means disposed for operation to connect the pair of parallel circuits across the exciter and the control field winding across said adjustable tap and the fixed tap whereby the directional energization of the control field winding is controlled in accordance with the potential at said taps.

7. In a regulating system for a dynamo-electric machine, in combination, an exciter for supplying the field excitation of the dynamo-electric machine, the exciter having a self-energizing field winding for normally supplying the field excitation thereof and a control field winding disposed to be directionally energized under predetermined conditions, a pair of circuits connected in parallel circuit relation between common taps disposed to be connected across the exciter, one of the parallel circuits consisting of a fixed resistor having an intermediate adjustable tap, the other of the parallel circuits consisting of a fixed resistor and a dry type rectifier unit connected in series circuit relation through a fixed tap therebetween, and means disposed for operation to connect the pair of parallel circuits across the exciter and the control field winding across said adjustable and fixed taps whereby the directional energization of the control field winding is controlled in accordance with the potential at said taps.

EDWIN L. HARDER.
CARROLL E. VALENTINE.

REFERENCES CITED

The following references are of record in the file of this patent:

UNITED STATES PATENTS

| Number | Name | Date |
|---|---|---|
| 1,621,429 | Petersen | Mar. 15, 1927 |
| 2,095,674 | O'Hagan | Oct. 12, 1937 |
| 2,100,854 | Kaufmann | Nov. 30, 1937 |